US008800111B2

(12) United States Patent
Haylock et al.

(10) Patent No.: US 8,800,111 B2
(45) Date of Patent: Aug. 12, 2014

(54) COAXIAL HINGE APPARATUS

(71) Applicant: Apple Inc., Cupertino, CA (US)

(72) Inventors: Jonathan M. Haylock, Cupertino, CA (US); Gordon C. Cameron, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/631,801

(22) Filed: Sep. 28, 2012

(65) Prior Publication Data

US 2014/0090203 A1    Apr. 3, 2014

(51) Int. Cl.
*E05D 11/08* (2006.01)

(52) U.S. Cl.
USPC .............................. 16/342; 16/386

(58) Field of Classification Search
USPC ............... 16/386, 342, 337, 338; 361/679.06, 361/679.08, 679.11, 679.12, 679.15, 361/679.27, 679.28; 455/575.1, 575.3, 455/575.4, 575.8, 550.1, 90.3; 348/373, 348/333.06, 794; 379/433.12, 433.13
See application file for complete search history.

(56) References Cited

U.S. PATENT DOCUMENTS

| 5,131,779 | A | * | 7/1992 | Sen | .................................. | 403/91 |
|---|---|---|---|---|---|---|
| 5,394,297 | A | | 2/1995 | Toedter | | |
| 5,494,447 | A | | 2/1996 | Zaidan | | |
| 5,751,544 | A | | 5/1998 | Song | | |
| 5,951,312 | A | * | 9/1999 | Horng | ............................ | 439/165 |
| 6,393,662 | B1 | | 5/2002 | Huang et al. | | |
| 6,404,622 | B1 | | 6/2002 | Chen | | |
| 6,741,472 | B1 | | 5/2004 | Barth et al. | | |
| 7,267,566 | B2 | * | 9/2007 | Ku et al. | ......................... | 439/165 |
| 7,401,383 | B2 | * | 7/2008 | Pan | .................. | 16/367 |
| 2002/0138946 | A1 | | 10/2002 | Lu | | |
| 2006/0002058 | A1 | * | 1/2006 | Zaderej et al. | ................ | 361/679 |
| 2006/0112516 | A1 | | 6/2006 | Chen et al. | | |
| 2007/0289097 | A1 | | 12/2007 | Barnett | | |
| 2008/0229544 | A1 | * | 9/2008 | Hsu et al. | ......................... | 16/223 |
| 2009/0126153 | A1 | | 5/2009 | Lin | | |
| 2010/0037431 | A1 | * | 2/2010 | Chiang | ........................... | 16/342 |
| 2010/0170064 | A1 | * | 7/2010 | Huang et al. | ..................... | 16/387 |
| 2012/0011683 | A9 | * | 1/2012 | Kim | ................................ | 16/386 |
| 2013/0010424 | A1 | * | 1/2013 | Degner et al. | ............ | 361/679.55 |

FOREIGN PATENT DOCUMENTS

JP      2003120112 A   *   4/2003
KR      20-0338321         1/2004

OTHER PUBLICATIONS

PCT Application No. PCT/US2013/059962—International Search Report and Written Opinion dated Dec. 20, 2013.

* cited by examiner

*Primary Examiner* — Chuck Mah

(74) *Attorney, Agent, or Firm* — Womble Carlyle Sandridge & Rice LLP

(57) ABSTRACT

A hinge apparatus includes an inner cylindrical housing having a first slot formed therethough extending between distal ends of the inner cylindrical housing, and an outer cylindrical housing having a second slot formed therethough extending between distal ends of the outer cylindrical housing and being configured to engage with the inner cylindrical housing. The first slot and second slot form unique paths which prevent complete alignment of the first slot and the second slot during axial rotation of the hinge apparatus.

16 Claims, 7 Drawing Sheets

COAXIAL HINGE APPARATUS

FIELD OF THE DESCRIBED EMBODIMENTS

The described embodiments relate generally to hinges, and more particularly, to coaxial hinge apparatuses useable in clutch assemblies.

BACKGROUND

Hinges for personal electronic devices typically provide a flexible attachment point allowing for operation of features intended to open and close, for example, lids or other panels. Furthermore, lids or other panels provide for unique mounting points for antenna and other communication components.

However, signal cables, including coaxial cables, necessary for communication with antennas in some circumstances may require crimped or fixedly attached connectors which may not allow for easy routing. For example, the crimped or fixedly attached connectors may be bulkier than the cables, and may not necessarily be routed without removal and re-crimping. Furthermore, crimping of connectors onto routed signal cables may be exceedingly difficult in scenarios where space is limited.

SUMMARY OF THE DESCRIBED EMBODIMENTS

This paper describes various embodiments that relate to hinges and/or clutches configured to be assembled about cabling without disturbing terminal ends of the cabling.

According to one embodiment of the invention, a hinge apparatus includes an inner cylindrical housing having a first slot formed therethough extending between distal ends of the inner cylindrical housing, and an outer cylindrical housing having a second slot formed therethough extending between distal ends of the outer cylindrical housing and being configured to engage with the inner cylindrical housing. According to this embodiment, the first slot and second slot form unique paths which prevent complete alignment of the first slot and the second slot during axial rotation of the hinge apparatus.

According to another embodiment of the invention, a hinge apparatus includes a first cylindrical member and a second cylindrical member configured to engage with the first cylindrical member. The first cylindrical member has a first outer cylindrical surface and a first slot formed through the first outer cylindrical surface extending between distal ends of the first cylindrical member. The second cylindrical member has a second outer cylindrical surface and a second slot formed through the second outer cylindrical surface extending between distal ends of the second cylindrical member. According to this embodiment, the first slot and second slot form unique paths along respective outer cylindrical surfaces which prevent complete alignment of the first slot and the second slot during axial rotation of the first cylindrical member relative to the second cylindrical member.

According to another embodiment of the invention, a clutch assembly of a personal electronic device includes at least one hinge apparatus configured to pivotally attach portions of the personal electronic device. The at least one hinge apparatus includes an inner cylindrical housing having a first slot formed therethough extending between distal ends of the inner cylindrical housing, and an outer cylindrical housing having a second slot formed therethough extending between distal ends of the outer cylindrical housing and being configured to engage with the inner cylindrical housing. According to this embodiment, the first slot and second slot form unique paths which prevent complete alignment of the first slot and the second slot during axial rotation of the hinge apparatus.

According to another embodiment of the invention, a hinge apparatus includes an inner cylindrical housing having a first slot formed therethough extending between distal ends of the inner cylindrical housing and an outer cylindrical housing having a second slot formed therethough extending between distal ends of the outer cylindrical housing and being configured to engage with the inner cylindrical housing. According to this embodiment, the first and second slots form unique paths which prevent the at least one cable to pass through the first and second slots simultaneously.

According to another embodiment of the invention, a method of assembling a portion of a personal electronic device includes obtaining a hinge apparatus. The hinge apparatus includes an inner cylindrical housing having a first slot formed therethough extending between distal ends of the inner cylindrical housing, and an outer cylindrical housing having a second slot formed therethough extending between distal ends of the outer cylindrical housing and being configured to engage with the inner cylindrical housing. The first slot and second slot form unique paths which prevent complete alignment of the first slot and the second slot during axial rotation of the hinge apparatus. The method further includes routing at least one signal cable through the first slot and the second slot and engaging the inner cylindrical housing and the outer cylindrical housing to form a hinge assembly.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

Various aspects of this disclosure may be better understood upon reading the following detailed description and upon reference to the drawings in which.

DETAILED DESCRIPTION OF SELECTED EMBODIMENTS

Representative applications of methods and apparatuses according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

As described herein, hinge apparatuses are provided which allow for a hinge to be assembled around terminated cables or cabling without removing crimped connectors. Such hinges may be useable in clutch assemblies of personal electronic devices.

Figure 1:
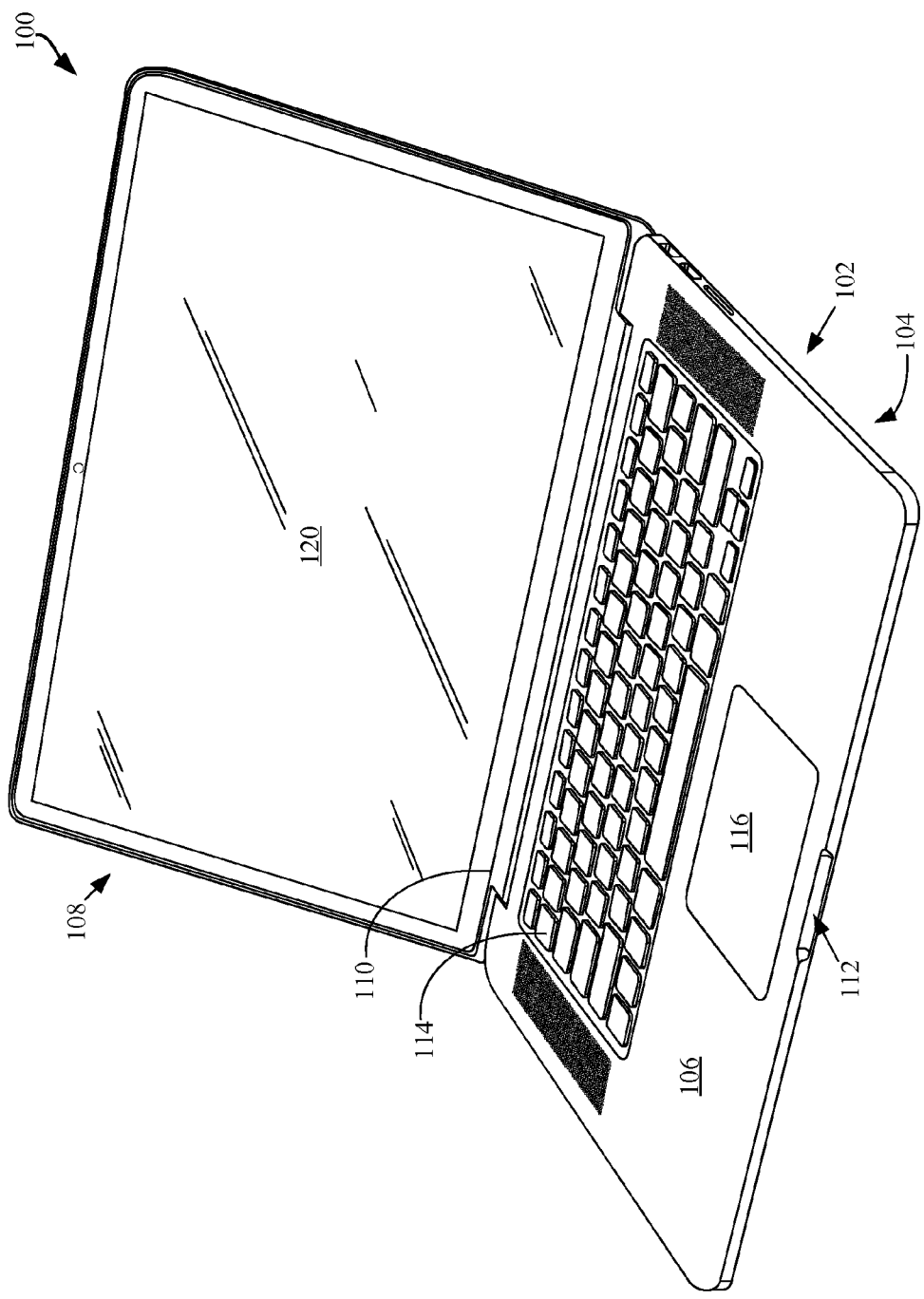
FIG. 1 is a perspective view of a personal electronic device.

FIG. 1 depicts a front facing perspective view of a personal electronic device 100 in an open (lid) state. Device 100 can include base portion 102 formed of bottom case 104 fastened to top case 106. Base portion 102 can be pivotably connected to lid portion 108 by way of clutch assembly 110 hidden from view by a cosmetic wall. Base portion 102 can have an overall uniform shape sized to accommodate clutch assembly 110 and inset portion 112 suitable for assisting a user in lifting lid portion 108 by, for example, a finger. Top case 106 can be configured to accommodate various user input devices such as keyboard 114 and touchpad 116. Keyboard 114 can include a plurality of low profile keycap assemblies each having an associated key pad.

Lid portion 108 can be moved with the aid of clutch assembly 110 from the closed position to remain in the open position and back again. Lid portion 108 can include display 120 and rear cover that can add a cosmetic finish to lid portion 108 and also provide structural support to at least display 120. The clutch assembly 110 may provide a resistive or biasing force suitable for supporting the display 120 and lid portion 108 in an open or closed position through the use of at least two interlocking and/or engaging portions, which are described more fully below with reference to FIGS. 2-6.

Figure 2:
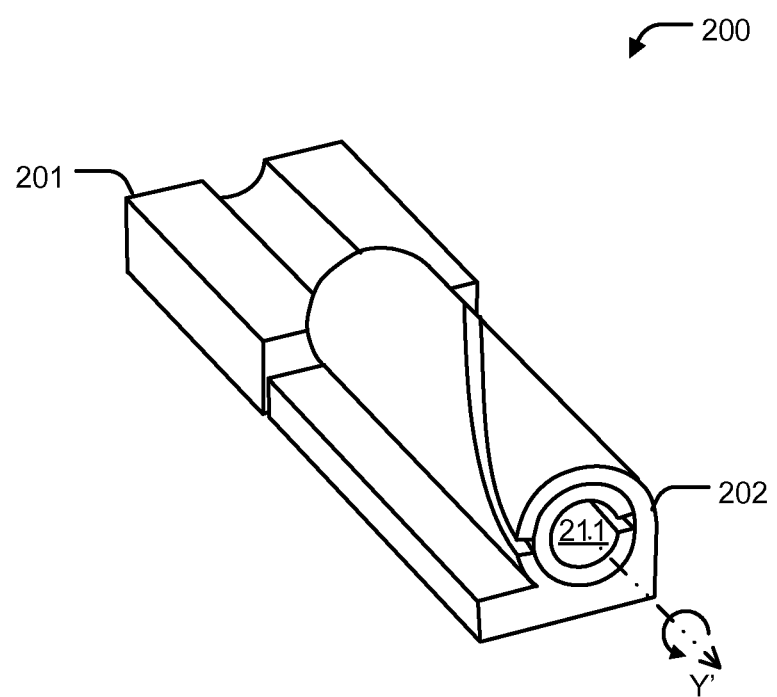
FIG. 2 is a perspective view of a clutch assembly, according to an embodiment of the invention.

FIG. 2 is a perspective view of a hinge apparatus 200, according to an embodiment of the invention. The hinge apparatus 200 may be used to form at least a portion of the clutch assembly 110. As shown, the apparatus 200 includes a first portion 201 configured to engage with a second portion 202. Furthermore, an inner cylindrical cavity 211 is defined therein providing for a route to pass cabling or other items.

The first portion 201 may rotate about the Y' axis relative to the second portion 202, and vice versa. For example, rotation of one or both of the first (201) and second (202) portions may not disturb the inner cylindrical cavity 211. Therefore, the inner cylindrical cavity may be appropriate for stable routing of cables for a final device assembly process.

Hereinafter, a more detailed description of the first and second portions 201 and 202 of the apparatus 200 is provided.

Figure 3:
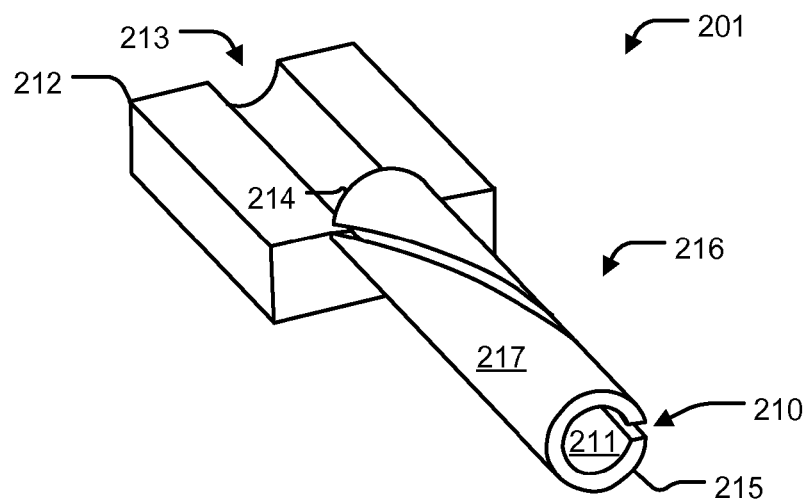
FIG. 3 is a perspective view of a first portion of the hinge apparatus of FIG. 2.

FIG. 3 is a perspective view of the first portion 201 of the hinge apparatus 200. As illustrated, the first portion 201 includes a cylindrical housing 216 fixedly coupled to a first base member 212. The cylindrical housing 216 is configured to engage within a complementary cylindrical housing of the second portion 202 illustrated in FIG. 2, and therefore, the cylindrical housing 216 may be termed an inner cylindrical housing and/or an inner cylindrical member.

The cylindrical housing 216 may include an outer cylindrical surface 217 with a generally longitudinal slot 210 formed therethrough. Generally, the outer cylindrical surface 217 may have a circumference sized to engage with an inner cavity of the second portion 202 of the apparatus 200. The slot 210 extends from a first distal end 214 of the cylindrical housing 216 to a second distal end 215 of the cylindrical housing 216. The slot 210 may form a first path along its length, and may have a width suitable for passing a cable or cables from exterior of the cylindrical housing 216 to the inner cylindrical cavity 211. Routed cable or cabling may rest on a semi-circular notch or cutout 213 formed in the base member 212.

The base member 212 may be fixedly attached to the bottom portion 106 of the device 100 in some embodiments, or may alternatively be fixedly attached to the lid portion 108. Attachment may be facilitated through the use of adhesives, welding, fasteners (e.g., screws, bolts), or other suitable forms of attachment. The base member 212 may be sized allow for relatively stable attachment, and may take forms other than the generally rectangular form illustrated.

Figure 4:
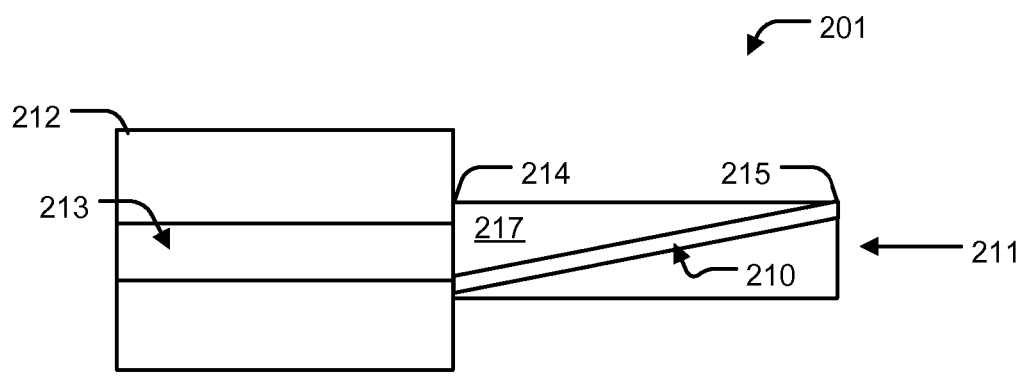
FIG. 4 is an elevation view of the first portion of FIG. 3.

Turning to FIG. 4, an elevation view of the first portion 201 is illustrated. As shown, the slot 210 extends between distal ends 214 and 215. Furthermore, the slot 210 allows for passing of cable therethrough to the inner cylindrical cavity 211.

Figure 5:
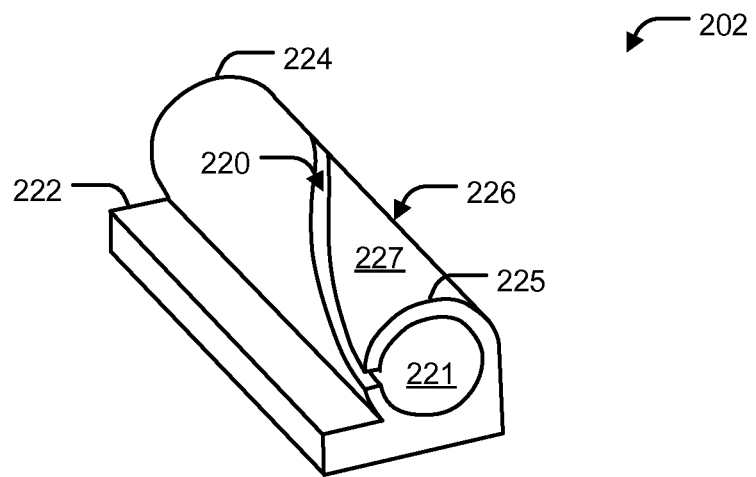
FIG. 5 is a perspective view of a second portion of the hinge apparatus of FIG. 2.

FIG. 5 is a perspective view of the second portion 202 of the hinge apparatus 200. As illustrated, the second portion 202 includes a cylindrical housing 226 fixedly coupled to a second base member 222. The cylindrical housing 226 is configured to engage about a complementary cylindrical housing 216 of the first portion 201, and therefore, the cylindrical housing 226 may be termed an outer cylindrical housing and/or an outer cylindrical member.

The cylindrical housing 226 may include an outer cylindrical surface 227 with a generally longitudinal slot 220 formed therethrough. The slot 220 extends from a first distal end 224 of the cylindrical housing 226 to a second distal end 225 of the cylindrical housing 226. The slot 220 may form a second path along its length, and may have a width suitable for passing a cable or cables from exterior of the cylindrical housing 226 to a second inner cylindrical cavity 221. The second inner cylindrical cavity 221 may have an inner cylindrical surface and a circumference sized to engage with the outer surface 217 of the first member 201.

For example, with reference to both FIGS. 3 and 5, the circumference of the second inner cylindrical cavity 221 may be slightly smaller than the circumference of the outer surface 217. Therefore, upon engagement, biasing forces created by expansion of the inner cylindrical cavity 221 and constriction of the inner cylindrical cavity 211 provide for a clutch-like action. Furthermore, clutch-like properties of the cylindrical surface within the inner cavity 221 and/or the outer surface 217 of the first portion 201 may be coated or treated to promote clutch-like action. Generally, if used as a hinge in a clutch assembly for a personal electronic device, clutch-like action and/or properties may include a coefficient of static friction greater than a coefficient of kinetic friction such that a lid supported with the hinge would be supported stably in an open or closed position, but still allow for repositioning.

Turning back to FIG. 5, the base member 222 may be fixedly attached to the bottom portion 106 of the device 100 in some embodiments, or may alternatively be fixedly attached to the lid portion 108. Attachment may be facilitated through the use of adhesives, welding, fasteners (e.g., screws, bolts), or other suitable forms of attachment. The base member 222 may be sized allow for relatively stable attachment, and may take forms other than the generally rectangular form illustrated.

Figure 6:
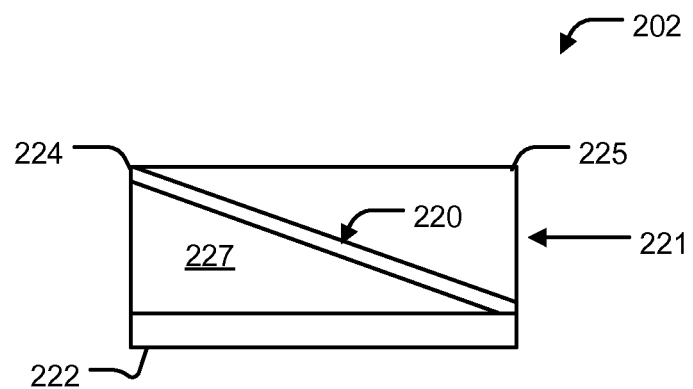
FIG. 6 is an elevation view of the second portion of FIG. 5.

Turning to FIG. 6, an elevation view of the second portion 202 is illustrated. As shown, the slot 220 extends between distal ends 224 and 225. Furthermore, the slot 220 allows for passing of cable therethrough to the second inner cylindrical cavity 221.

Hereinafter, engagement of the first and second portions 201 and 202 is described more fully with reference to FIGS. 7-8.

Figure 7:
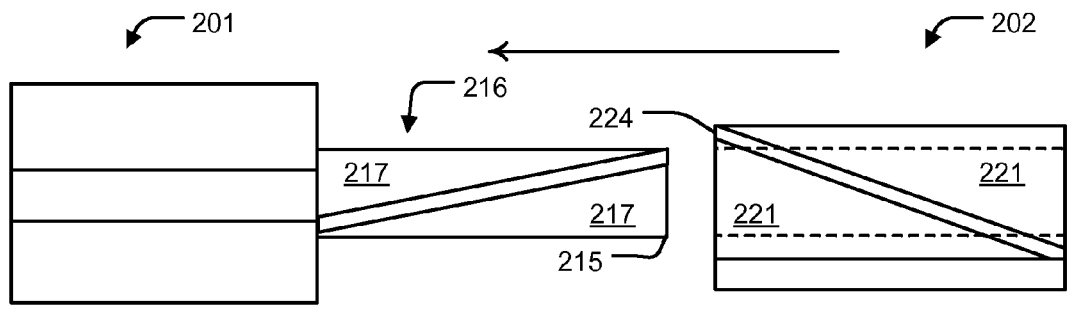
FIG. 7 is a diagram depicting engagement of the first and second portions of the hinge apparatus of FIG. 2.
Figure 8:
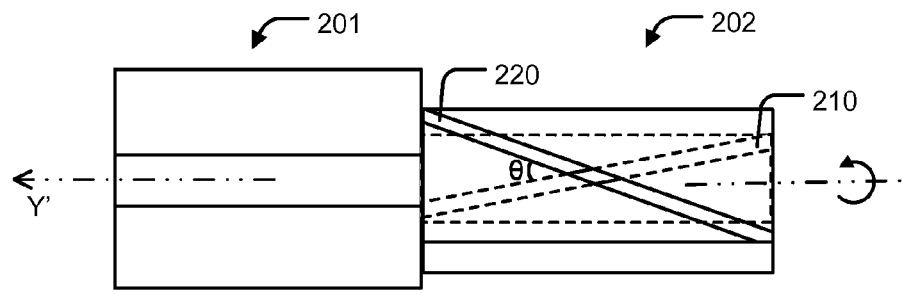
FIG. 8 is a diagram depicting unique paths of slots of the hinge apparatus of FIG. 2.

FIG. 7 is a diagram depicting engagement of the first and second portions of the hinge apparatus 200 of FIG. 2. As shown, the distal end 215 of the cylindrical housing 216 may be engaged with the second inner cavity 221 of the second portion 202 at the distal end 224. To facilitate engagement, the cylindrical housing 216 may be constricted through use of at least two dies applied to the distal end 215. The dies may be any suitable dies, including dies configured to compress a spring-like cylindrical member 216 to reduce its outer circumference. Alternatively, or in combination, the relative size of the cavity 221 may be increased. For example, the slot 220 may be temporarily widened through use of a deflection member inserted therein. The deflection member or tool may be a generally slotted tool somewhat similar to a slotted screwdriver. The tool may be turned to increase the width of the slot 220, thereby increasing an overall volume of the cavity 220 to facilitate engagement of the first and second portions. Upon engagement, the dies and/or tool may be removed to form the apparatus as illustrated in FIG. 2.

As described above, the slots 210 and 220 form unique paths which should not completely align during rotation of one or both of the first and second portions 201 and 202. For example, FIG. 8 is a diagram depicting the unique paths of the slots 210 and 220. As shown, there exists an angle θ between each slot such that rotation about the Y' axis will not allow complete alignment of both slots 210 and 220. Therefore, the first and second slots form unique paths which prevent the at least one cable to pass through the first and second slots simultaneously (e.g., while the hinge apparatus is assembled). The angle θ may be a fixed value throughout rotation, or may change depending upon the arrangement of the slots. The paths may be generally linear, helical, or any combination of both. Furthermore, the slots 210 and 220 may be formed in a spiraling counter rotational fashion. According to one embodiment, the first slot 210 is a linear slot along a first linear path, the second slot 220 is a linear slot along a second linear path, and the first and second linear paths are arranged at an angle to one another. The angle, in this particular scenario, would be a constant angle. According to another embodiment, the first slot is a helical slot along a first helical path and the second slot is a helical slot along a second helical path crossing the first helical path. In this particular scenario, the helical paths would not align due to the second helical path crossing the first.

Additionally, one of the slots may be generally linear, while the other is linear, helical, spiral, or otherwise formed. Therefore, exhaustive description of every permutation of slot arrangements is omitted herein for the sake of brevity.

Figure 9:
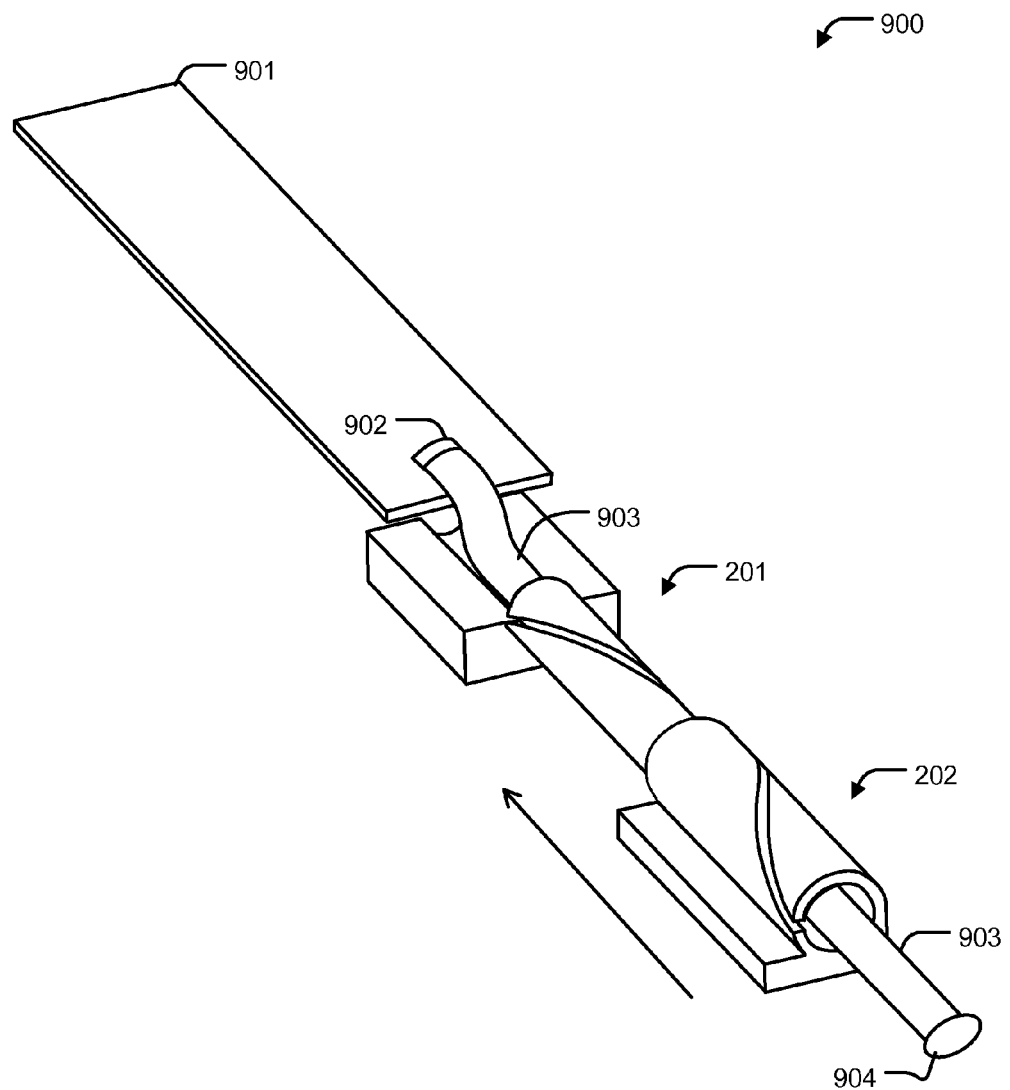
FIG. 9 is an exploded perspective view of the hinge apparatus of FIG. 2 with cabling routed therein.

The lack of alignment of the slots allows for stable routing of a cable, cabling, or other member within the hinge apparatus while preventing the same from otherwise falling out. For example, FIG. 9 is an exploded perspective view of the hinge apparatus 200 with cabling routed therein. As shown, cabling 903 may include terminal ends 902 and 904. Terminal end 902 may be coupled to an electrical component or printed circuit board (PCB) 901, and therefore, would not allow routing directly through a cylindrical cavity smaller than the PCB 901. Terminal end 904 may further have a profile inhibitive of directly routing through a cylindrical cavity.

However, as illustrated, the cabling 903 may be routed through each of slots 210 and 220 successively, and subsequent engagement of the first portion 201 and the second portion 202 may be facilitated. Therefore, a fully operational hinge apparatus with cabling routed therein may be formed and used in final device assembly.

Figure 10:
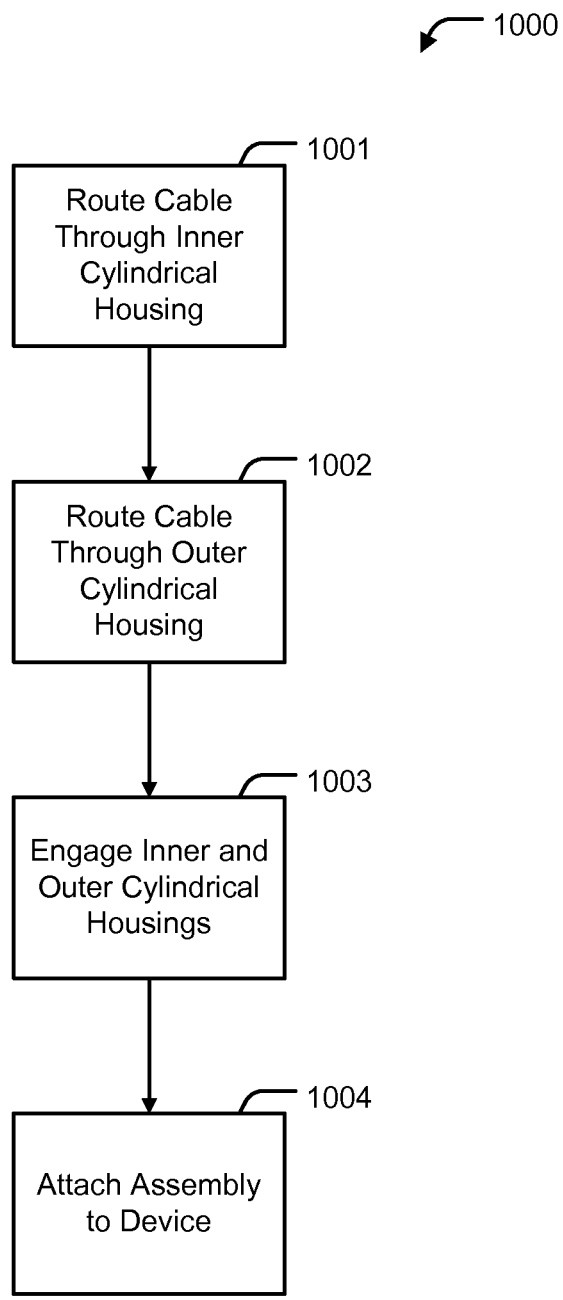
FIG. 10 is a flowchart of a method of assembling a hinge assembly, according to an embodiment of the invention.

FIG. 10 is a flowchart of a method 1000 of assembling a hinge apparatus 200, according to an embodiment of the invention. As shown, the method 1000 includes routing one or more cables or cabling through a slot formed in an inner cylindrical housing at block 1001. For example, the inner cylindrical housing may be similar to housing 216 illustrated in FIG. 3. Thereafter, the method 1000 includes routing one or more cables or cabling through an outer cylindrical housing at block 1002. For example, the outer cylindrical housing may be similar to housing 226 of FIG. 5.

It is noted that blocks 1001 and 1002 may be alternated in order without departing from the scope of embodiments of the invention.

Upon successful routing of the cable or cabling, the method 1000 includes engaging the inner and outer cylindrical housings to form a hinge assembly or apparatus at block 1003. The engaging may be facilitated through use of a set of dies and/or a deflection tool as described above with reference to FIG. 7.

The formed assembly may then be attached to a personal electronic device at block 1004. For example, a base member associated with the inner cylindrical housing may be attached to a first portion of a personal electronic device such as bottom panel 106 of FIG. 1. Further, the base member associated with the outer cylindrical housing may be attached to a second portion of the personal electronic device such as lid 108 of FIG. 1. The attached hinge apparatus would subsequently function as a hinge or clutch, with cabling routed therein. One or more terminal ends of the routed cable or cabling may then be attached to associated electronic components to establish operative communication therebetween.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A clutch assembly configured to pivotally couple a lid portion to a base portion of a portable computing device, the clutch assembly comprising:
    a first hinge apparatus and a second hinge apparatus, each hinge apparatus comprising:
        an inner cylindrical housing having a first slot formed therethough extending between distal ends of the inner cylindrical housing, and
        an outer cylindrical housing having a second slot formed therethough extending between distal ends of the outer cylindrical housing and being configured to engage with an exterior surface of the inner cylindrical housing to create a friction fit between the inner and outer cylindrical housings; and
    a clutch assembly housing disposed between the first hinge apparatus and the second hinge apparatus and enclosing an electronic component, an electrical connector cable associated with the electronic component installed within the hinge apparatus by passing the electrical connector cable through the first slot and the second slot of the first hinge,
    wherein the first slot and the second slot form unique paths which prevent complete alignment of the first slot and the second slot during axial rotation of the hinge apparatus.

2. The hinge apparatus of claim 1, further comprising:
    a first base member coupled to the inner cylindrical housing of the first hinge, the first base member comprising a semi-circular notch being configured to provide a pathway between the electronic component and the inner cylindrical housing for the electrical connector; and
    a second base member coupled to the outer cylindrical housing of the first hinge, the second base member being configured to be attached to lid portion of the personal electronic device.

3. The hinge apparatus of claim 1, wherein:
    the first slot is a linear slot along a linear path;
    the second slot is a helical slot along a helical path; and
    the first and second linear paths are arranged at an angle to one another.

4. The hinge apparatus of claim 1, wherein:
    the first slot is a helical slot along a first helical path; and
    the second slot is a helical slot along a second helical path arranged at an angle different than the first helical path.

5. A hinge apparatus, comprising:
    a first cylindrical member, the first cylindrical member comprising:
        a channel aligned with a longitudinal axis of the first cylindrical member, and
        a first outer cylindrical surface having a first slot formed through the first outer cylindrical surface extending between distal ends of the first cylindrical member;
    a base member integrally formed with the first cylindrical member, the base member comprising a notch aligned with the channel and a support surface configured to support at least a portion of a printed circuit board (PCB);
    a second cylindrical member, the second cylindrical member having a second outer cylindrical surface and having a second slot formed through the second outer cylindrical surface extending between distal ends of the second cylindrical member, the second cylindrical member being configured to engage with the first outer cylindrical surface to create a friction fit between the first cylindrical member and the second cylindrical member; and
    a signal cable routed through the channel of the first cylindrical member, the signal cable comprising a first end larger than a cross-section of the channel, and a second end coupled to the printed circuit board,
    wherein the first slot and second slot form unique paths along respective outer cylindrical surfaces which prevent complete alignment of the first slot and the second slot during axial rotation of the first cylindrical member relative to the second cylindrical member.

6. The hinge apparatus of claim 5, wherein the channel of the first cylindrical member further comprises an inner cylindrical cavity configured to receive a plurality of signal cables for routing in a personal electronic device.

7. The hinge apparatus of claim 5, wherein the second cylindrical member further comprises an inner cylindrical surface, the inner cylindrical surface configured to engage with the first outer cylindrical surface to regulate rotation of the first cylindrical member relative to the second cylindrical member.

8. The hinge apparatus of claim 7, further comprising:
    another base member coupled to the second cylindrical member,
    wherein the hinge apparatus is configured to pivotally attach portions of a personal electronic device.

9. The hinge apparatus of claim 8, wherein the first cylindrical member further comprises an inner cylindrical cavity configured to receive one or more signal cables for routing between the pivotally attached portions of the personal electronic device.

10. The hinge apparatus of claim 5, wherein:
    the first slot is a helical slot along a linear path on the first outer cylindrical surface; and
    the second slot is a linear slot along a linear path on the second outer cylindrical surface.

11. The hinge apparatus of claim 5, wherein:
    the first slot is a helical slot along a first helical path; and
    the second slot is a helical slot along a second helical path.

12. A clutch assembly of a personal electronic device, comprising:
    at least one hinge apparatus configured to pivotally attach a lid portion and a base portion of the personal electronic device, the at least one hinge apparatus comprising:
        an inner cylindrical housing having a first slot formed therethough extending between distal ends of the inner cylindrical housing, and
        an outer cylindrical housing having a second slot formed therethough extending between distal ends of the outer cylindrical housing and being configured to engage with an exterior surface of the inner cylindrical housing to create a friction fit between the inner and outer cylindrical housings, wherein the first slot and second slot form unique paths which prevent complete alignment of the first slot and the second slot during axial rotation of the hinge apparatus; and
    a clutch assembly housing disposed proximate the hinge apparatus and enclosing an electronic component, an electrical connector associated with the electronic component passing through an inner cylindrical cavity longitudinally disposed within the inner cylindrical housing.

13. The clutch assembly of claim 12, wherein friction fit between the inner and outer cylindrical housings resists motion of the lid portion relative to the base portion.

14. The clutch assembly of claim 12, further comprising:
    a first base member coupled to the inner cylindrical housing; and a second base member coupled to the outer cylindrical housing,
wherein the first and second base members are configured to pivotally attach the portions of the personal electronic device.

15. The clutch assembly of claim 12, wherein:
the first slot is a linear slot along a linear path; and
the second slot is a helical slot along a helical path.

16. The clutch assembly of claim 12, wherein:
the first slot is a helical slot along a first helical path; and
the second slot is a helical slot along a second helical path.

* * * * *

UNITED STATES PATENT AND TRADEMARK OFFICE
CERTIFICATE OF CORRECTION

| | | |
|---|---|---|
| PATENT NO. | : 8,800,111 B2 | Page 1 of 1 |
| APPLICATION NO. | : 13/631801 | |
| DATED | : August 12, 2014 | |
| INVENTOR(S) | : Jonathan M. Haylock et al. | |

It is certified that error appears in the above-identified patent and that said Letters Patent is hereby corrected as shown below:

In the Claims:

Column 7, line 21 "the hinge" should read --the first hinge--.

Column 7, line 23 "the first hinge," should read --the first hinge apparatus,--.

Column 7, line 26 "the hinge" should read --the first hinge--.

Column 7, line 30 "the first hinge," should read --the first hinge apparatus,--.

Column 7, line 33 "electrical connector;" should read --electrical connector cable;--.

Column 7, line 35 "the first hinge," should read --the first hinge apparatus,--.

Column 7, lines 36-37 "to lid portion of the personal electronic device." should read --to the lid portion of the portable computing device--.

Column 7, line 41 "second linear paths" should read --second slots--.

Column 8, line 62 "wherein friction" should read --wherein a friction--.

Signed and Sealed this
Twenty-first Day of April, 2015

Michelle K. Lee
*Director of the United States Patent and Trademark Office*